United States Patent
Wondra et al.

(10) Patent No.: US 10,708,674 B2
(45) Date of Patent: Jul. 7, 2020

(54) SYSTEMS AND METHODS FOR ENABLING AND MONITORING CONTENT CREATION WHILE CONSUMING A LIVE VIDEO

(71) Applicant: Rovi Guides, Inc., San Jose, CA (US)

(72) Inventors: Dylan Matthew Wondra, Mountain View, CA (US); Jean Michelle Somlo, Sunnyvale, CA (US); Michaela Schlocker Logan, San Jose, CA (US); Mario Miguel Sanchez, San Jose, CA (US); William L. Thomas, Evergreen, CO (US)

(73) Assignee: Rovi Guides, Inc., San Jose, CA (US)

( * ) Notice: Subject to any disclaimer, the term of this patent is extended or adjusted under 35 U.S.C. 154(b) by 24 days.

(21) Appl. No.: 16/023,457

(22) Filed: Jun. 29, 2018

(65) Prior Publication Data

US 2020/0007958 A1  Jan. 2, 2020

(51) Int. Cl.
| | | |
|---|---|---|
| *H04N 21/454* | (2011.01) | |
| *H04N 21/8545* | (2011.01) | |
| *H04N 21/81* | (2011.01) | |
| *H04N 21/2187* | (2011.01) | |
| *H04N 5/445* | (2011.01) | |
| *G06F 16/9535* | (2019.01) | |

(52) U.S. Cl.
CPC ..... *H04N 21/8545* (2013.01); *G06F 16/9535* (2019.01); *H04N 5/44543* (2013.01); *H04N 21/2187* (2013.01); *H04N 21/8146* (2013.01)

(58) Field of Classification Search
CPC .... H04N 7/0882; H04N 7/0884; H04N 7/155; H04N 5/23229; H04N 5/76; H04N 1/2125; H04N 21/454; G11B 27/031; G06K 9/00765; G06Q 10/101
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield | |
| 7,165,098 B1 | 1/2007 | Boyer | |
| 7,761,892 B2 | 7/2010 | Ellis | |
| 8,046,801 B2 | 10/2011 | Ellis | |
| 10,031,911 B2 * | 7/2018 | Sharma | G10L 15/22 |
| 2002/0174430 A1 | 11/2002 | Ellis | |
| 2005/0251827 A1 | 11/2005 | Ellis | |
| 2010/0153885 A1 | 6/2010 | Yates | |
| 2014/0163980 A1 * | 6/2014 | Tesch | G10L 21/10 704/235 |

(Continued)

*Primary Examiner* — Ngoc K Vu
(74) *Attorney, Agent, or Firm* — Haley Guiliano LLP

(57) ABSTRACT

Systems and methods for enabling and rewarding collaborative content creation are described. The method comprises, playing back live video provided by an over-the-top (OTT) provider to a user, receiving, from the user, a command to crop and modify a portion of the video comprising a subject, generating user-generated content based on the command, publishing the user-generated content to a plurality of users, determining whether the user-generated content is republished a threshold number of times during a republication period, and in response to determining that the user-generated content is republished the threshold number of times during the republication period, unlocking access to content from the OTT provider for the user that relates to the subject.

20 Claims, 10 Drawing Sheets

(56) References Cited

U.S. PATENT DOCUMENTS

2016/0224672 A1\* 8/2016 Bindal ................ G06F 16/9535
2016/0307599 A1\* 10/2016 Snell ...................... G11B 27/34
2018/0091468 A1\* 3/2018 Yong ....................... H04L 51/32

\* cited by examiner

SYSTEMS AND METHODS FOR ENABLING AND MONITORING CONTENT CREATION WHILE CONSUMING A LIVE VIDEO

BACKGROUND

Related art systems enable users to generate content based on a live primary content (e.g. Oscars) that the user is watching (e.g., by enabling users to create a screen shot, from which they may generate a meme). However, in related art systems, the platform (e.g. Amazon video) that provides the live primary content, is unable to leverage the popularity of the live primary content to promote other non-live content offered by the same platform. Related art systems are unable to calculate the popularity of the user-generated content related to live primary content (e.g., over the multiple social media platforms on which the user-generated content is shared). Therefore, related art systems are unable to determine whether the user-generated content is popular. As a result, the related art systems are unable to leverage the popularity of the live primary content and user-generated content to promote other non-live content on the OTT.

SUMMARY

Accordingly, systems and methods are provided herein for enabling and monitoring collaborative content creation. While watching primary content provided by a content provider, multiple users may wish to generate and share user-generated content related to the primary content with their friends to enhance their watching experience. In such examples, the content provider may monitor the users that provide the user-generated content. The content provider may use the information gathered from monitoring the users to determine which users created the content that was the most popular. The prior art systems fail to leverage the popularity of live OTT content to promote non-live OTT content that is related to the live OTT content. A media guidance application, being executed by the content provider, receives user-generated content related to the live OTT content. In some embodiments, the media guidance application may manage multiple content providers, and provide information to the appropriate provider. The media guidance application determines whether the user-generated content is popular and in response to determining that the user-generated content is popular, the media guidance application determines a subject of the user-generated content and unlocks content that is related to the user-generated content. The popular user-generated content may increase the viewership of the live primary content and the non-live content that is also provided by the content provider. In order to keep the users generating content related to the live primary content, the content provider may provide an incentive to a user that provides popular user-generated content within a time-frame. For example, a user may be watching a live video (e.g., "Oscars"), provided by an over-the-top (OTT) service provider (e.g., "amazon video") and may wish to share an interesting video clip or picture from the live video with their friends. In such examples, the media guidance application may receive commands from a user to extract and modify a video clip or picture from the video and share this user-generated content with his or her friends. Once shared, the media guidance application may determine whether the user-generated content is popular. If the media guidance application determines that the content is popular, the media guidance application may determine a subject of the user-generated content and unlock access to locked content of the OTT provider related to the user-generated content.

In some aspects, the media guidance application plays back live video provided by an OTT provider to a user. For example, the media guidance application may play back a live broadcast of the Oscars over an OTT provider (e.g., "amazon video"). In such examples, the media guidance application may have access to the OTT provider (e.g., "amazon video") using login credentials provided by the user. The media guidance application may display to the user, content from the OTT provider that is accessible to the user. And upon receiving a user selection to watch the Oscars, the media guidance application may request the OTT to provide the live video for display.

While watching the live video, the user may come across interesting events that the user may wish to share with others. In some embodiments, the media guidance application crops, based on a command received from the user, a portion of the video. For example, while watching the Oscars, the user may come across a funny face made by an actor (e.g., "Meryl Streep"). The media guidance application may receive a command from the user to crop that portion of the video from the live video. In some examples, the media guidance application may receive a command from the user to crop a video clip of a short duration from the live video that captures an event of interest the user wishes to share. In some examples, the media guidance application may receive a command to crop an image from the live video.

Before sharing the cropped portion of the live video with other users, the user may wish to modify the cropped portion to provide some more context. In such scenarios, the media guidance application generates user-generated content by modifying the cropped portion of the live video based on input received from the user. For example, the media guidance application may receive an instruction from the user to crop a portion of the live video that includes an event of interest to the user. In response to the instruction received from the user, the media guidance application may crop a portion of the live video that includes an event of interest to the user. In this example, the cropped portion may include a funny statement or expression by an actor (e.g., "Meryl Streep") in the cropped portion of the video. In some examples, the media guidance application may receive an instruction to further modify the cropped portion of the live video by adding text to the cropped portion of the live video. In this example, the actor "Meryl Streep" may be clapping and shouting during the "Oscars" show, and the user may wish crop that portion of the live video to add the text "Work It" to the cropped portion of the live video.

The user may then command the media guidance application to share the modified cropped portion of the video (user-generated content) with a plurality of users. In some embodiments, the media guidance application, in response to the command received from the user, publishes the user-generated content to a plurality of users. The media guidance application may use a profile associated with the user to determine the social network platforms that the user is associated with, and publish the user-generated content on all of those social networking platforms. In some examples, the media guidance application may also publish the content on any blogs or websites associated with the user.

After sharing the user-generated content, the media guidance application determines whether the user-generated content was popular. The media guidance application may determine whether the user-generated content is republished at least a threshold number of times during a republication period. For example, the media guidance application may determine a popularity of user-generated content by determining how many users have shared the user-generated content. In this example, the media guidance application, in response to a command from the user, may share user-generated content with other users, a few of those other users may like the user-generated content and wish to share it with their friends and this may go on. The media guidance application keeps track of the number of times the user-generated content was shared. In such examples, the media guidance application may designate a threshold number of times the user-generated content should be shared in a predetermined time frame in order to be designated as 'popular'. In examples where, multiple user-generated content may meet the minimum republication threshold within the time frame, the media guidance application may select the one with higher number of republications.

Once the media guidance application determines that the user-generated content is popular, the media guidance application attempts to determine a subject related to the user-generated content. In some embodiments, in response to determining that the user-generated content is republished at least the threshold number of times during the republication period, the media guidance application determines a subject of the user-generated content. The media guidance application may determine a subject related to the user-generated content by analyzing the modifications made to the cropped portion of the live video by the user. The media guidance application may also analyze the cropped portion of the live video and determine whether the cropped portion of the live video have an actor depicted in it. In such examples, the media guidance application may also determine if the cropped portion of the video have any audio signal. Based on these determinations, and more, the media guidance application may generate metadata tags that indicate a subject related to the user-generated content.

The media guidance application may use the determined subject to search for restricted media content related to the user-generated content by the OTT provider. In some embodiments, the media guidance application determines locked content provided by the OTT provider that is related to the subject of the user-generated content. For example, based on the cropped portion of the video, the media guidance application may determine that the user-generated content was related to "Meryl Streep" as Meryl Streep was in the cropped portion of the video. Additionally, the media guidance application may analyze any modifications to the cropped portion of the video. In this example, the user modified the cropped portion by adding the string "Work it" to the cropped portion of the video. Based on the determination, the media guidance application may search for locked media content provided by the OTT provider ("e.g., amazon video") related to "Meryl Streep" and the phrase "Work It."

Based on the searching, the media guidance application may unlock locked content related to the user-generated content on the OTT provider as a recognition for generating popular user-generated content. In some embodiments, the media guidance application unlocks access for the user to the locked content. For example, the media guidance application may communicate to the OTT provider that the user-generated content relating to "Meryl Streep" and "Work It" is popular, and unlock locked content, like "Mamma Mia" and songs related to "Missy Eliot" for the consumption of the user.

In order to determine the subject related to the user generated content, the media guidance application analyzes the modifications made to the cropped portion of the video. In some embodiments, the media guidance application determines whether generating the user-generated content comprised modifying the cropped portion of the video by adding a string of characters to the cropped portion of the video. For example, in the process of generating user-generated content, the media guidance application may receive a command from the user to add text to the cropped portion of the video to provide context for the cropped portion of the video for people who were not watching the live video. In such examples, in the cropped portion of the video including "Meryl Streep", the user may command the media guidance application to add the words "Work It".

Based on determining that the text was added to the cropped portion of the video, the media guidance application parses the text to determine a reference to locked content related to the subject of the text. In response to determining that generating the user-generated content comprised modifying the cropped portion of the video by adding a string of characters to the cropped portion of the video, the media guidance application parses the string of characters to determine a plurality of phrases. In the previous example, upon determining that the media guidance application received a user command to add text to the cropped portion of the video, the media guidance application parses the text to determine the phrases that constitute the text. In this example, the media guidance application may parse "Work It" into "Work" and "It".

The media guidance application searches through the database for the phrases that constitute the text that was added to the cropped portion of the video. In some embodiments, the media guidance application searches through metadata of candidate locked content for any of the plurality of phrases, and determines based on the search, a candidate locked content to be the locked content related to the subject. For example, the media guidance application may search through metadata associated with locked media content available on the OTT provider using the phrases as a search key. As the phrases include "Work", "It", and "Work It", the media guidance application may search through metadata associated with restricted content provided by the OTT provider to determine candidate restricted content to be provided by the user. During such searching, the media guidance application may come across movies like "Mamma Mia", "Devil wears Prada" and "The Post" that are restricted to the user and feature "Meryl Streep". The media guidance application may find, "Work It" is part of lyrics of the song "Work It" by Missy Elliot. The media guidance application may unlock access to the songs from Missy Elliot for the user.

From the text added to the cropped portion of the video, the media guidance application determines whether the text refers to a particular locked content. In some embodiments, the media guidance application determines whether the string of characters refers to a particular locked content. For example, the media guidance application may determine that the phrase "Work It" added to the cropped portion of the video is part of lyrics of the song "Work It" by Missy Elliot.

In some embodiments, in response to determining that the string of characters refers to a particular locked content, the media guidance application unlocks access for the user to the particular content. In this example, the media guidance application may unlock the access to the song "Work It" by Missy Elliot on the OTT provider.

The media guidance application may also determine a connotation of the string of characters added to the cropped portion of the video, and use the connotation to unlock content for the user. In some embodiments, the media guidance application determines, from the string of characters, a connotation of the string of characters. For example, to determine a connotation, the media guidance application may search for certain phrases within the string of characters that indicate a connotation related to the string of characters. The media guidance application determines a preference of the user, in relation to the subject of the user-generated content, based on the connotation.

For example, the media guidance application uses this connotation to determine whether the user likes or dislikes the media content referenced by the user-generated content. The media guidance application may search for certain phrases in the string of characters. Some of these phrases like 'interesting', 'awesome', 'beautiful', may indicate a positive connotation to the media content referenced by the user-generated content. In response to determining that the connotation is positive, the media guidance application increases a strength of association between the user and the locked content. For example, if the phrases in the string of characters include words like "Work It Rocks", the media guidance application determines a positive correlation between the user and the content "Work It". In such examples, the media guidance application may increase the likelihood of the user to listen to more songs by Missy Elliot. In case the media guidance application determines that the string of characters includes phrases like "sucks", "bad", "terrible", the media guidance application determines that the connotation of the string of characters is negative. In response to determining that the connotation is negative, decreasing a strength of association between the user and the locked content. For example, if the media guidance application determines that the string of characters includes the phrase "Work It is Horrible", the media guidance application determines a negative correlation between the user and the content "Work It". In such examples, the media guidance application may decrease the likelihood of the user to listen to more songs by Missy Elliot.

In order to determine the subject related to the user generated content, the media guidance application analyzes the cropped portion of the video to determine the presence of an actor in the cropped portion of the video. In some embodiments, the media guidance application parses the cropped portion of the live video to determine an actor depicted in the cropped portion of the video. The media guidance application may determine a presence of an actor in the cropped portion of the video by analyzing each frame that constitutes the cropped portion of the video. In some embodiments, the media guidance application determines that the actor is the subject of the user-generated content. In some examples, the media guidance application may determine that the actor is the subject of the user-generated content based on determining that the actor covers most of each frame that constitutes the cropped portion of the video. The media guidance application compares a depiction of the actor to a plurality of entries of a database, wherein each entry in the plurality of entries stores a depiction of an actor and an identity of the actor. For example, the media guidance application may determine features of an actor that include a complexion, height, facial structure, and compare the determined features to a database that include a set of measurements for a plurality of actors. From the comparison, the media guidance application may determine an identity of the actor. The media guidance application uses the determined identity of the actor to search through metadata of candidate locked content for metadata indicating the identity of the actor. The media guidance application may search in a particular field of the metadata (e.g., "starring") to determine based on the search, the locked content.

In some embodiments, the actor depicted in the cropped portion of the video may perform a particular action that may be used to filter the locked content associated with the actor. In some embodiments, the media guidance application determines from the depiction of the actor, an action performed by the actor. For example, the media guidance application may divide the cropped portion of the video into a plurality of frames and analyze each frame to determine whether the actor is performing an action. From the analysis, the media guidance application may deduce an action being performed in the cropped portion of the live video. The media guidance application may depict the action in terms of which parts of the body moving and the pattern traced by the actor in the cropped portion of the live video. The media guidance application may compare a depiction of the action to a second plurality of entries of a database, wherein each entry in the second plurality of entries stores a depiction of an action and an identity of the action. From the database, the media guidance application may determine an identity of the action. For example, in response to determining that the actor waves his hand in a back and forth manner, the media guidance application may determine that the actor is waving his hand. In some examples, the media guidance application may determine a particular dance step or a gesture performed by the actor. The media guidance application may search through the metadata of the locked content for data indicating the action. For example, the media guidance application may compare the depiction of the action to a database that includes depictions of many different actions. From the comparison, the media guidance application may determine the identity of the action. Using the identity, the media guidance application may search through metadata of candidate locked content for metadata indicating the action, and determine based on the search, a second part of the locked content. In some embodiments, the action may be a car chase from the movie "Batman." In such embodiments, the media guidance application may determine a famous object (e.g. "The Batmobile") instead of a famous actor.

In order to determine the subject related to the user generated content, the media guidance application determines whether the cropped portion of the video has an audio signal. In some embodiments, the media guidance application analyzes the cropped portion of the video to determine whether the cropped portion of the video comprises an audio signal. In response to determining that the cropped portion of the video comprises an audio signal, the media guidance application parses the audio signal to determine a plurality of phrases. The media guidance application searches through metadata associated with candidate locked content provided by the OTT provider metadata corresponding to a phrase of the plurality of phrases. For example, the media guidance application may determine that the cropped portion of the live video includes an audio signal. The media guidance application may determine that the audio signal may contain a plurality of phrases spoken by an actor. In some embodiments, the media guidance application may determine that the audio signal includes music. The media guidance application may use the phrases or the musical file as a search key to search through metadata associated with the locked content. Based on the searching, the media guidance application determines candidate locked content to be designated as the locked content.

Upon gauging the popularity of user-generated content, a different user may wish to modify the user-generated content to make it contextually relevant to users related to the different user. In some embodiments, the media guidance application may receive an input from a different user that modifies the user-generated content. For example, the different user may wish to change some of the modifications made by the user. In this example, the different user may wish to change the text, or add new text to the cropped portion of the user-generated content. In some embodiments, the media guidance application publishes the modified user-generated content to the plurality of users. For example, the media guidance application may receive an instruction from the different user to share the modified version of user-generated content to a plurality of users associated with the different user. The media guidance application may determine whether the modified user-generated content is republished at least the threshold number of times during the republication period, and in response to determining that the modified user-generated content is republished at least the threshold number of times during the republication period, the media guidance application determines a different subject of the modified user-generated content. The media guidance application determines the different locked content provided by the OTT provider that is related to the different subject of the user-generated content, and unlocking access for the different user to the different locked content. For example, the media guidance application may determine that the user has replaced the text of the cropped portion of the video with "Why so serious?" Based on the modification to the user-generated content, the media guidance application may determine that the modified user-generated content in addition to relating to Meryl Streep, may also be related to the "Batman" trilogy, stored on the OTT provider, based on the text added to the user-generated content. The access to the "Batman" trilogy may be locked for the different user. The media guidance application may unlock access to the "Batman" trilogy on the OTT provider.

The media guidance application, may determine a similarity between the modified user-generated content and the user-generated content. In some embodiments, the media guidance application compares the user-generated content and the modified user-generated content. The media guidance application calculates a level of similarity between the user-generated content and the modified user-generated content. The media guidance application may perform an image comparison between the user-generated content and the modified user-generated content. In case the user-generated content and the modified user-generated content are images, the media guidance application may perform an image comparison between the two images to determine a level of similarity between the user-generated content and the modified user-generated content. Based on the calculation, the media guidance application determines whether the level of similarity is over a certain threshold, and in response to determining that the level of similarity is over the threshold, unlocking access for the user to the different plurality of locked content. For example, the media guidance application may determine that the modified user-generated content with the text "Why so serious?" is substantially similar to the user-generated content with the text "Work it". Based on the similarity, the media guidance application may reward the user for creating the user-generating content by providing access to the "Batman" trilogy to the user as was provided to the different user.

In some embodiments, the media guidance application receives a selection of the user-generated content from a different user, and provides the different user with a copy of the live video, wherein the copy of the live video includes an indication of a play position corresponding to a position from where the cropped portion of the video was generated. For example, upon receiving a selection of the user-generated content from a different user, the media guidance application may transport the different user to the particular location in a copy of the live video, from where the user-generated content was generated, to provide a reference of the generation of the user-generated content.

BRIEF DESCRIPTION OF DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are provided herein for enabling and rewarding collaborative content creation. While watching primary content provided by a content provider, multiple users may wish to generate and share user-generated content related to the live primary content with their friends to enhance their watching experience. In such examples, the content provider may monitor the users that provide the user-generated content. The content provider may use the information gathered from monitoring the users to determine which users created the content that was the most popular. The popular user-generated content may increase the viewership of the live primary content and the non-live content that is also provided by the content provider. In order to keep the users generating content related to the live primary content, the content provider may provide an incentive to the user that provides the most popular user-generated content within a time-frame. For example, a user may be watching a live video (e.g., "Oscars"), provided by an over-the-top (OTT) service provider (e.g., "amazon video") and may wish to share an interesting video clip or picture from the live video with their friends. In such examples, the user may provide commands to a media guidance application to extract and modify a video clip or picture from the video and share this user-generated content with their friends using the media guidance application. Once shared, the media guidance application may determine whether the user-generated content is popular. In some embodiments, the media guidance application may determine that the content is popular, and may subsequently determine a subject of the user-generated content and unlock access to locked content of the OTT provider related to the user-generated content. The OTT provider may reward the users for creating popular user-generated content based on live videos provided, because the popular user-generated content may increase the traffic of multiple users for the OTT provider.

Figure 1:
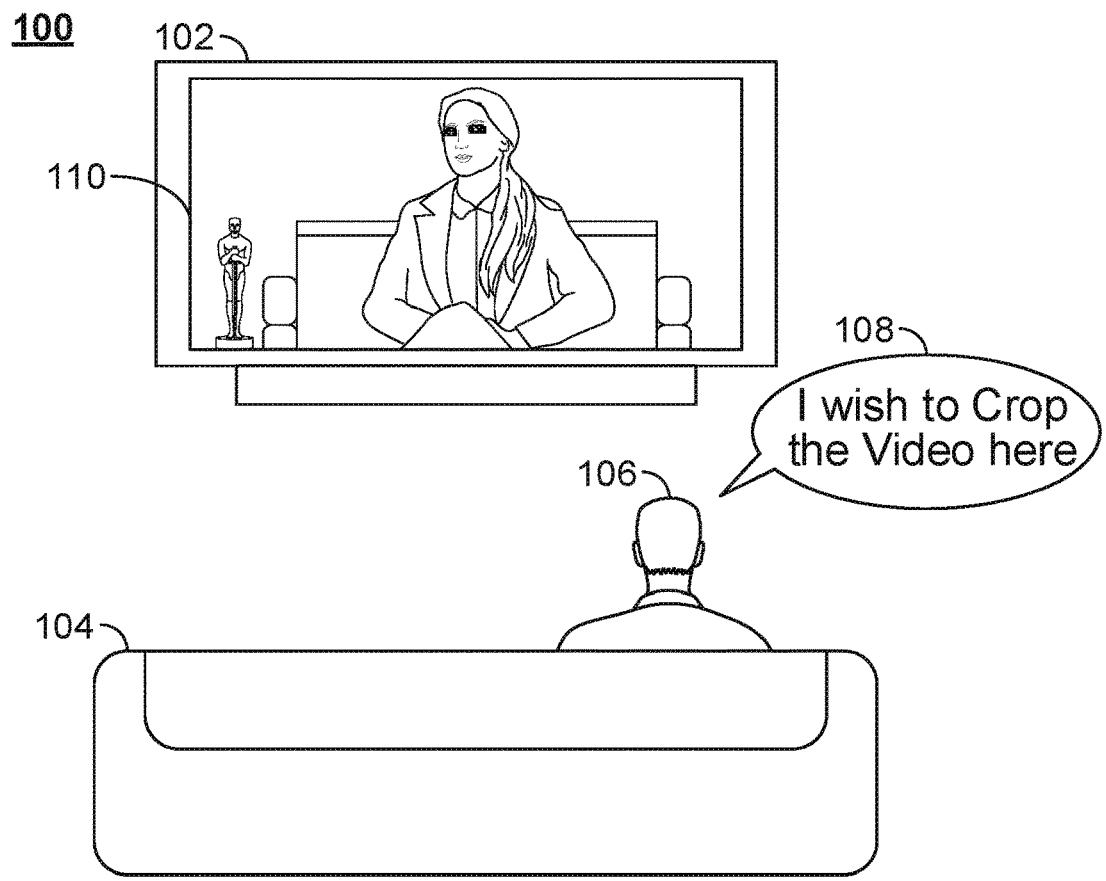
FIG. 1 shows an illustrative example of cropping a video while consuming a live video, in accordance with some embodiments of the disclosure.

FIG. 1 shows an illustrative example of cropping a video while consuming a live video, in accordance with some embodiments of the disclosure. FIG. 1 shows a user 106 sitting on a sofa 104 watching media asset 110 (e.g., a live video of an event, such as the Oscars), provided by an OTT provider (e.g., amazon video), on a user equipment device 102. The media guidance application may have access to the OTT provider using login credentials provided by the user 106. The media guidance application may generate for display to the user 106, content from the OTT provider that is accessible to the user 106. And upon receiving a selection from user 106 to watch media asset 110, the media guidance application may request the OTT provider to provide media asset 110 for display. In some embodiments, the media guidance application may first determine whether the user 106 is authorized to access the media asset 110. The media guidance application may determine this based on the amount of permissions provided to the media guidance application by the OTT provider.

While watching media asset 110 on user equipment device 102, the user 106 may come across interesting events that the user 106 may wish to share with others. The media guidance application may receive a command from user 106 crop a portion of the video containing the interesting portion. As shown in FIG. 1, the user 106, provides a command 108 "I wish to crop the video here." In response to receiving the command from the user, the media guidance application crops, based on a command received from the user 106, a portion of the video. For example, while watching the Oscars, the user 106 may come across a funny face made by an actor (e.g., "Meryl Streep"). The media guidance application may receive a command from user 106 to crop that portion of the video from media asset 110. In some examples, the media guidance application may receive a command from user 106 to crop a video clip of a short duration from media asset 110 that captures an event of interest the user 106 wishes to share. In some examples, the media guidance application may receive a command from user 106 to crop an image from media asset 110.

In some embodiments, the cropped portion of media asset 110 by itself may not be interesting or funny enough for other users. In such embodiments, before sharing the cropped portion of media asset 110 with other users, the user 106 may wish to modify the cropped portion to provide some more context. The media guidance application may receive a command from user 106 to modify the cropped portion of media asset 110. For example, the user 106 may instruct the media guidance application to crop a portion of media asset 110 that includes an event of interest to the user 106. In this example, the cropped portion may include a funny statement or expression by an actor (e.g., "Meryl Streep") in the cropped portion of media asset 110. In some examples, the user 106 may further wish to modify the cropped portion of media asset 110 by adding text to the cropped portion of media asset 110. In this example, the actor "Meryl Streep" may be making clapping and shouting during the "Oscars" show, and the user 106 may wish crop that portion of media asset 110 to add the text "Work It" to the cropped portion of media asset 110. In some embodiments, the user 106 may modify the cropped portion of media asset 110 by adding a geolocation of the user 106, or the place media asset 110 is being filmed at. In some embodiments, the user 106 may modify the cropped portion of media asset 110 by overwriting an audio signal of the video using a custom soundtrack. In some embodiments, the user 106 may modify the video by removing the sound from the cropped portion of media asset 110 altogether. In some embodiments, the user 106 may modify the cropped portion of media asset 110 by overlaying a color filter on the cropped portion of media asset 110 to change the color of the video. In some embodiments, the user 106 may modify the cropped portion of media asset 110 by increasing or decreasing the playback speed of the cropped portion of media asset 110.

Figure 2:
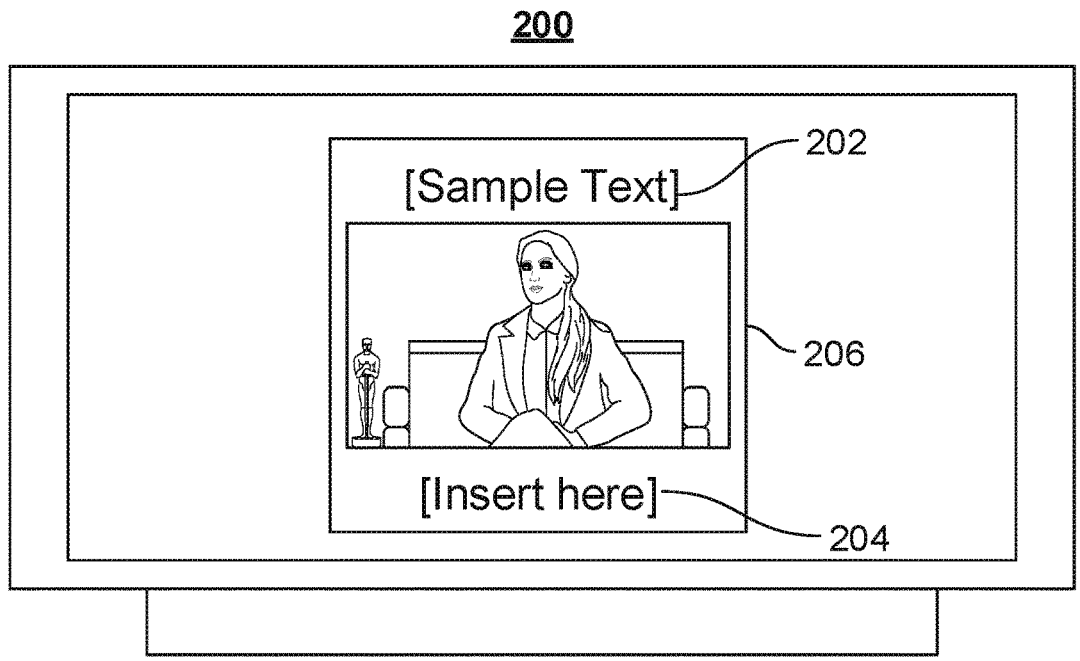
FIG. 2 shows an illustrative example of modifying the cropped video, in accordance with some embodiments of the disclosure.

FIG. 2 shows an illustrative example of cropping a video while consuming a live video, in accordance with some embodiments of the disclosure. FIG. 2 depicts the user equipment device 102 with a cropped portion of media asset 110 and user modification 202 and 204. For the sake of depiction, FIG. 2 depicts modifying the cropped portion of media asset 110 adding a string of texts 202 and 204. However, any modification may be made to the cropped portion of media asset 110 as described with respect to FIG. 1.

After modifying the cropped portion of media asset 110, the user may ask the media guidance application to share the user-generated content 206 with a plurality of users. The media guidance application publishes the user-generated content 206 to a plurality of users. In some embodiments, the publishing may include sharing user-generated content 206 on a plurality of social media platforms accessed by the user. In some embodiments, the media guidance application may use a profile associated with the user 106 to determine the social network platforms that the user 106 is associated with, and publish the user-generated content 206 on all of those social networking platforms. In some embodiments, publishing may include sharing user-generated content 206 on websites associated with the user 106. In some embodiments, the media guidance application may, in response to a command received from the user 106, publish the content on any blogs or websites associated with the user 106. In some embodiments, the OTT provider may have a forum where users watching media asset 110 may communicate with each other. In such embodiments, the media guidance application may, in response to a command received from the user 106, publish the user-generated content 206 in a "comments" section provided by the OTT provider (e.g., amazon video") on which the user 106 is watching media asset 110. In some embodiments, publishing the content may also include point-to-point communication between two users. For example, the media guidance application, may receive a command from user 106 to send the user-generated content 206 to a friend via text message or email. In some embodiments, publishing the content may also include posting the content on websites or blogs that are related to the media asset 110. For example, the determined media asset 110 may have a website associated with it, and the user 106 may ask the media guidance application to post the user-generated content 206 on the website. In some embodiments, the media guidance application may determine a user-maintained thread or blog related to media asset 110 on a website like Facebook or Reddit. In such embodiments, publishing user-generated content 206 may include posting the content on such a website or blog or thread associated with the media asset 110.

After sharing the user-generated content 206, the media guidance application determines whether the user-generated content 206 was popular among the users that it was shared. The media guidance application may determine whether the user-generated content 206 is republished at least a threshold number of times during a republication period. In some embodiments, the republication period may be set by the OTT provider to determine which a threshold for which user-generated content 206 is popular. In some embodiments, the OTT provider may increase or decrease the republication period based on the amount of content received from the users watching media asset 110. In some embodiments, in order to determine the popularity of user-generated content 206, the media guidance application may identify a signature of user-generated content 206. The signature may be a hash-value identifier associated with user-generated content 206. The hash-value may include an identification of user 106 that generated user-generated content 206. In some embodiments, the media guidance application may trace the hash-value of user-generated content over the multiple social media platforms associated with user 106, where user-generated content 106 was shared. In some embodiments, media guidance application may share user-generated content 106 on a first social media platform associated with the user (e.g., Facebook). However, a different user may request the media guidance application to share user-generated content 206 on a second social media platform not associated with the user (e.g., Twitter). Using the hash-value associated with user-generated content 206, the media guidance application may attribute user-generated content 206 to user 106 and count the republications from the second social media platform. In such embodiments, the media guidance application may determine the number of times the user-generated content 206 was shared for each platform on which the user-generated content 206 is determined to be present. In this example, the user 106 may share user-generated content 206 with their friends, a few of those friends may like the user-generated content 206 and wish to share it with their friends and this may go on.

In some embodiments, the media guidance application may share user-generated content 206 in a communication section provided by the OTT provider (e.g., Amazon). In such embodiments, the media guidance application may determine a number of times other users with access to the OTT provider have liked or shared user-generated content 206. The media guidance application may attribute the shares and likes as republications to user 106 based on the hash-value of user-generated content 206. In some embodiments, the media guidance application may receive a command from the user to text or email user-generated content 206 to a particular user. The media guidance application may follow the hash-value of user-generated content 206 in the point-to-point communication (e.g. SMS and email) to determine a number of times users have shared user-generated content 206. In some embodiments, the media guidance application may query platforms like Messages, Gmail, Outlook, Facebook, Twitter, Reddit, Snapchat, Instagram, and many others to determine a number of times user-generated content 206 was republished.

Once the media guidance application determines that the user-generated content 206 is popular, the media guidance application attempts to determine a subject related to the user-generated content. In response to determining that the user-generated content 206 is republished at least the threshold number of times during the republication period, the media guidance application 206 determines a subject of the user-generated content 206. The media guidance application may determine a subject related to the user-generated content 206 by analyzing the modifications made to the cropped portion of media asset 110 by the user 106. The media guidance application may also analyze the cropped portion of media asset 110 to determine whether the cropped portion of media asset 110 has an actor depicted in it. In such examples, the media guidance application may also determine if the cropped portion of media asset 110 has an audio signal. Based on these determinations, and more, the media guidance application may generate metadata tags that indicate a subject related to the user-generated content.

In order to determine the subject related to the user-generated content 206, the media guidance application analyzes the modifications 202, 204 made to the cropped portion of media asset 110. In some embodiments, the media guidance application determines whether generating the user-generated content 206 comprised modifying the cropped portion of media asset 110 by adding a string of characters 202, 204 to the cropped portion of media asset 110. For example, in the process of generating user-generated content 206, the user 106 may command the media guidance application to add text 202, 204 to the cropped portion of media asset 110 to provide context for the cropped portion of media asset 110 for people who were not watching media asset 110. In such examples, in the cropped portion of media asset 110 including "Meryl Streep", the user 106 may command the media guidance application to at the words "Work It".

Based on determining that the text was added to the cropped portion of media asset 110, the media guidance application parses the text to determine a reference to locked content related to the subject of the text. In response to determining that generating the user-generated content comprised modifying the cropped portion of the live video by adding a string of characters to the cropped portion of the live video, the media guidance application parses the string of characters to determine a plurality of phrases. In the previous example, upon determining that the user 106 commanded the media guidance application to add text to the cropped portion of the live video, the media guidance application parses the text determine the phrases that constitute the text. In this example, the media guidance application may parse "Work It" into "Work" and "It".

The media guidance application searches through the database for the phrases that constitute the text that was added to the cropped portion of media asset 110. The media guidance application searches through metadata of candidate locked content for any of the plurality of phrases, and determines based on the search, a candidate locked content to be the locked content related to the subject. For example, the media guidance application may search through metadata associated with locked media content available on the OTT provider using the phrases as a search key. As the phrases include "Work", "It", and "Work It", the media guidance application may search through metadata associated with restricted content provided by the OTT provider to determine candidate restricted content to be provided by the user 106. During such searching, the media guidance application may come across movies like "Mamma Mia", "Devil wears Prada" and "The Post" that are restricted to the user 106 and feature "Meryl Streep". The media guidance application may Similarly, "Work It" is part of lyrics of the song "Work It" by Missy Elliot. The media guidance application may unlock access to the songs from Missy Elliot for the user 106. In some embodiments, the media guidance application may unlock access to a premium music streaming service (e.g. Spotify, YouTube Red) for a predetermined period of time, where user 106 could find any music they would wish to listen. In some embodiments, the media guidance application may unlock access to a premium video streaming service (e.g. Netflix, Amazon Prime) for a predetermined period of time, where user 106 could find any program they would wish to watch.

From the text added to the cropped portion of the live video, the media guidance application determines whether the text refers to a particular locked content. The media guidance application determines whether the string of characters refers to a particular locked content. For example, the media guidance application may determine that the phrase "Work It" added to the cropped portion of media asset 110 is part of lyrics of the song "Work It" by Missy Elliot.

In response to determining that the string of characters refers to a particular locked content, the media guidance application unlocks access for the user 106 to the particular content. In this example, the media guidance application may unlock the access to the song "Work It" by Missy Elliot on the OTT provider.

The media guidance application may also determine a connotation of the string of characters added to the cropped portion of media asset 110, and use the connotation to unlock content for the user 106. In some embodiments, the media guidance application determines, from the string of characters, a connotation of the string of characters. For example, to determine a connotation, the media guidance application may search for certain phrases within the string of characters that indicate a connotation related to the string of characters. The media guidance application determines a preference of the user 106, in relation to the subject of the user-generated content, based on the connotation.

For example, the media guidance application uses this connotation to determine whether the user 106 likes or dislikes the media content referenced by the user-generated content 206. The media guidance application may search for certain phrases in the string of characters. Some of these phrases like 'interesting', 'awesome', 'beautiful', may indicate a positive connotation to the media content referenced by the user-generated content. In response to determining that the connotation is positive, the media guidance application increases a strength of association between the user 106 and the locked content. For example, if the phrases in the string of characters include words like "Work It Rocks", the media guidance application determines a positive correlation between the user 106 and the content "Work It". In such examples, the media guidance application may increase the likelihood of the user 106 to listen to more songs by Missy Elliot. In case the media guidance application determines that the string of characters includes phrases like "sucks", "bad", "terrible", the media guidance application determines that the connotation of the string of characters is negative. In response to determining that the connotation is negative, decreasing a strength of association between the user 106 and the locked content. For example, if the media guidance application determines that the string of characters includes the phrase "Work It is Horrible", the media guidance application determines a negative correlation between the user 106 and the content "Work It". In such examples, the media guidance application may decrease the likelihood of the user 106 to listen to more songs by Missy Elliot.

In order to determine the subject related to the user-generated content 206, the media guidance application analyzes the cropped portion of media asset 110 to determine the presence of an actor in the cropped portion of media asset 110. In some embodiments, the media guidance application parses the cropped portion of media asset 110 to determine an actor depicted in the cropped portion of media asset 110. The media guidance application may determine a presence of an actor in the cropped portion of media asset 110 by analyzing each frame that constitutes the cropped portion of media asset 110. The media guidance application determines that the actor is the subject of the user-generated content 206. In some examples, the media guidance application may determine that the actor is the subject of the user-generate content based on determining that the actor covers most of each frame that constitutes the cropped portion of media asset 110. The media guidance application compares a depiction of the actor to a plurality of entries of a database, wherein each entry in the plurality of entries stores a depiction of an actor and an identity of the actor. For example, the media guidance application may determine features of an actor that include a complexion, height, facial structure, and compare the determined features to a database that include a set of measurements for a plurality of actors. From the comparison, the media guidance application may determine an identity of the actor. The media guidance application uses the determined identity of the actor to search through metadata of candidate locked content for metadata indicating the identity of the actor. The media guidance application may search in a particular field of the metadata (e.g., "starring") to determine based on the search, the locked content.

The actor depicted in the cropped portion of media asset 110 may perform a particular action that may be used to filter the locked content associated with the actor. In some embodiments, the media guidance application determines from the depiction of the actor, an action performed by the actor. For example, the media guidance application may divide the cropped portion of media asset 110 into a plurality of frames and analyze each frame to determine whether the actor is performing an action. From the analysis, the media guidance application may deduce an action being performed in the cropped portion of media asset 110. The media guidance application may depict the action in terms of which parts of the body moving and the pattern traced by the actor in the cropped portion of media asset 110. The media guidance application may compare a depiction of the action to a second plurality of entries of a database, wherein each entry in the second plurality of entries stores a depiction of an action and an identity of the action. From the database, the media guidance application may determine an identity of the action. For example, in response to determining that the actor waves his hand in a back and forth manner, the media guidance application may determine that the actor is waving his hand. In some examples, the media guidance application may determine a particular dance step or a gesture performed by the actor. The media guidance application may search through the metadata of the locked content for data indicating the action. For example, the media guidance application may compare the depiction of the action to a database that includes depictions of many different actions. From the comparison, the media guidance application may determine the identity of the action. Using the identity, the media guidance application may search through metadata of candidate locked content for metadata indicating the action, and determine based on the search, a second part of the locked content.

In order to determine the subject related to the user-generated content, the media guidance application determines whether the cropped portion of media asset 110 has an audio signal. In some embodiments, the media guidance application analyzes the cropped portion of media asset 110 to determine whether the cropped portion of media asset 110 comprises an audio signal. In response to determining that the cropped portion of media asset 110 comprises an audio signal, the media guidance application parses the audio signal to determine a plurality of phrases. The media guidance application searches through metadata associated with candidate locked content provided by the OTT provider metadata corresponding to a phrase of the plurality of phrases. For example, the media guidance application may determine that the cropped portion of media asset 110 includes an audio signal. The media guidance application may determine that the audio signal may contain a plurality of phrases spoken by an actor. In some embodiments, the media guidance application may determine that the audio signal includes music. The media guidance application may use the phrases or the musical file as a search key to search through metadata associated with the locked content. Based on the searching, the media guidance application determines candidate locked content to be designated as the locked content.

Upon gauging the popularity of user-generated content 206, a different user may wish to modify the user-generated content 206 to make it contextually relevant to users related to the different user. In some embodiments, the media guidance application may receive an input from a different user that modifies the user-generated content 206. For example, the different user may wish to change some of the modifications made by the user 106. In this example, the different user may wish to change the text, or add new text to the cropped portion of the user-generated content 206. The media guidance application publishes the modified user-generated content 206 to the plurality of users. In some embodiments, user 106, upon sensing that user-generated content 206 is gaining popularity, may generate a template of user-generated content 206 for other users to modify and share to improve the watching experience. The media guidance application may calculate a hash-value for the template and look for the hash-value in modified versions of user-generated content 206 to determine similarity. For example, the different user may now modify and share the modified version of the template of user-generated content 206 to a plurality of users associated with the different user. The media guidance application may now determine whether the modified user-generated content 206 is republished at least the threshold number of times during the republication period, and in response to determining that the modified user-generated content 206 is republished at least the threshold number of times during the republication period, the media guidance application determines a different subject of the modified user-generated content 206. The media guidance application determines the different locked content provided by the OTT provider that is related to the different subject of the user-generated content 206, and unlocking access for the different user to the different locked content. For example, the media guidance application may determine that the user has replaced the text of the cropped portion of media asset 110 with "Why so serious?" Based on the modification to the user-generated content 206, the media guidance application may determine that the modified user-generated content 206 in addition to relating to Meryl Streep, may also be related to the "Batman" trilogy, stored on the OTT provider, based on the text added to the user-generated content 206. The access to the "Batman" trilogy may be locked for the different user. The media guidance application may unlock access to the "Batman" trilogy on the OTT provider.

The media guidance application, may determine a similarity between the modified user-generated content 206 and the user-generated content 206. In some embodiments, the media guidance application compares the user-generated content 206 and the modified user-generated content. The media guidance application calculates a level of similarity between the user-generated content 206 and the modified user-generated content. The media guidance application may perform an image comparison between the user-generated content 206 and the modified user-generated content. In case the user-generated content 206 and the modified user-generated content are images, the media guidance application may perform an image comparison between the two images to determine a level of similarity between the user-generated content 206 and the modified user-generated content. Based on the calculation, the media guidance application determines whether the level of similarity is over a certain threshold, and in response to determining that the level of similarity is over the threshold, unlocking access for the user to the different plurality of locked content. In some embodiments, the score of similarity may be determined by the media guidance application based on factors including the presence of the actor, the text in the modified user-generated content, whether or not the template generated by user 106 was used. In such embodiments, the media guidance application may be able to identify a template of the user-generated content 206 used based on a hash-value of the template calculated when the template was shared by user 106. In case the modified user-generated content, generated by a different user, is more popular than user-generated content 206, media guidance application unlocks the locked content referenced by the modified user-generated content for user 106 to incentivize users to keep generating content. For example, the media guidance application may determine that the modified user-generated content with the text "Why so serious?" is substantially similar to the user-generated content 206 with the text "Work it". Based on the similarity, the media guidance application may reward the user 106 for creating the user-generating content by providing access to the "Batman" trilogy to the user 106 as was provided to the different user.

In some embodiments, the media guidance application receives a selection of the user-generated content 206 from a different user, and provides the different user with a copy of media asset 110, wherein the copy of media asset 110 includes an indication of a play position corresponding to a position from where the cropped portion of media asset 110 was generated. For example, upon receiving a selection of the user-generated content 206 from a different user, the media guidance application may transport the different user to the particular location in a copy of media asset 110, from where the user-generated content 206 was generated, to provide a reference of the generation of the user-generated content 206.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
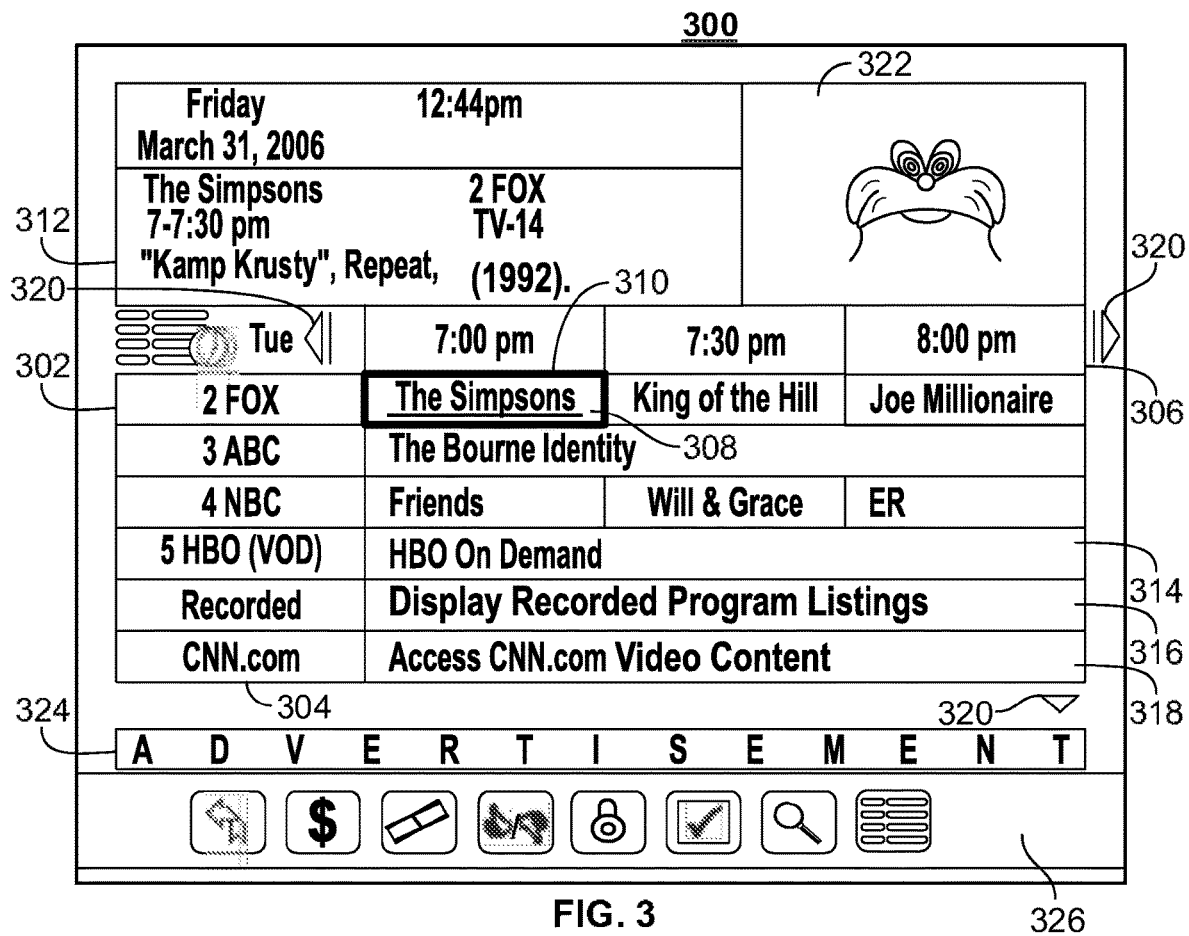
FIG. 3 shows an illustrative embodiment of a display screen that may be used to provide media guidance application listings and other media guidance information, in accordance with some embodiments of the disclosure.
Figure 4:
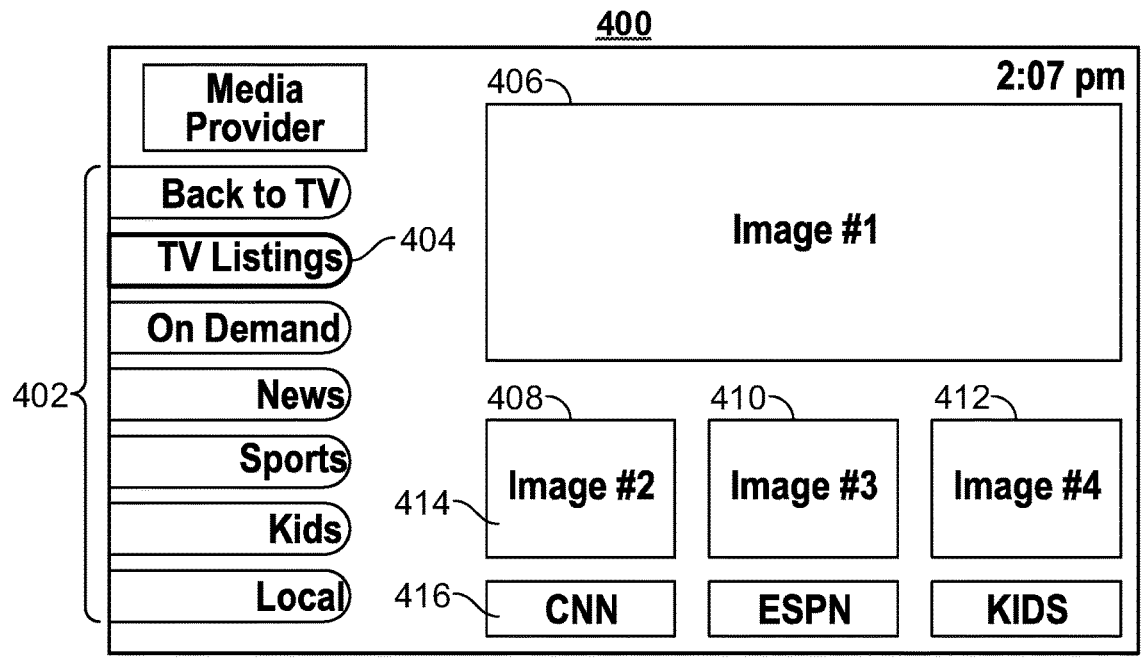
FIG. 4 shows another illustrative embodiment of a display screen that may be used to provide media guidance application listings, in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
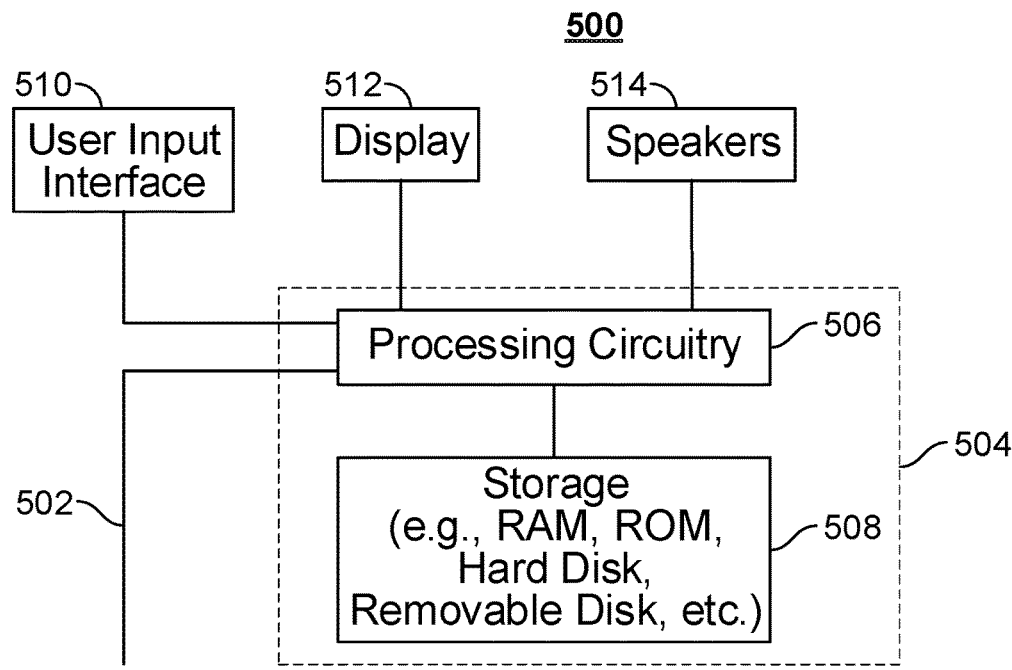
FIG. 5 is a block diagram of an illustrative user equipment (UE) device, in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
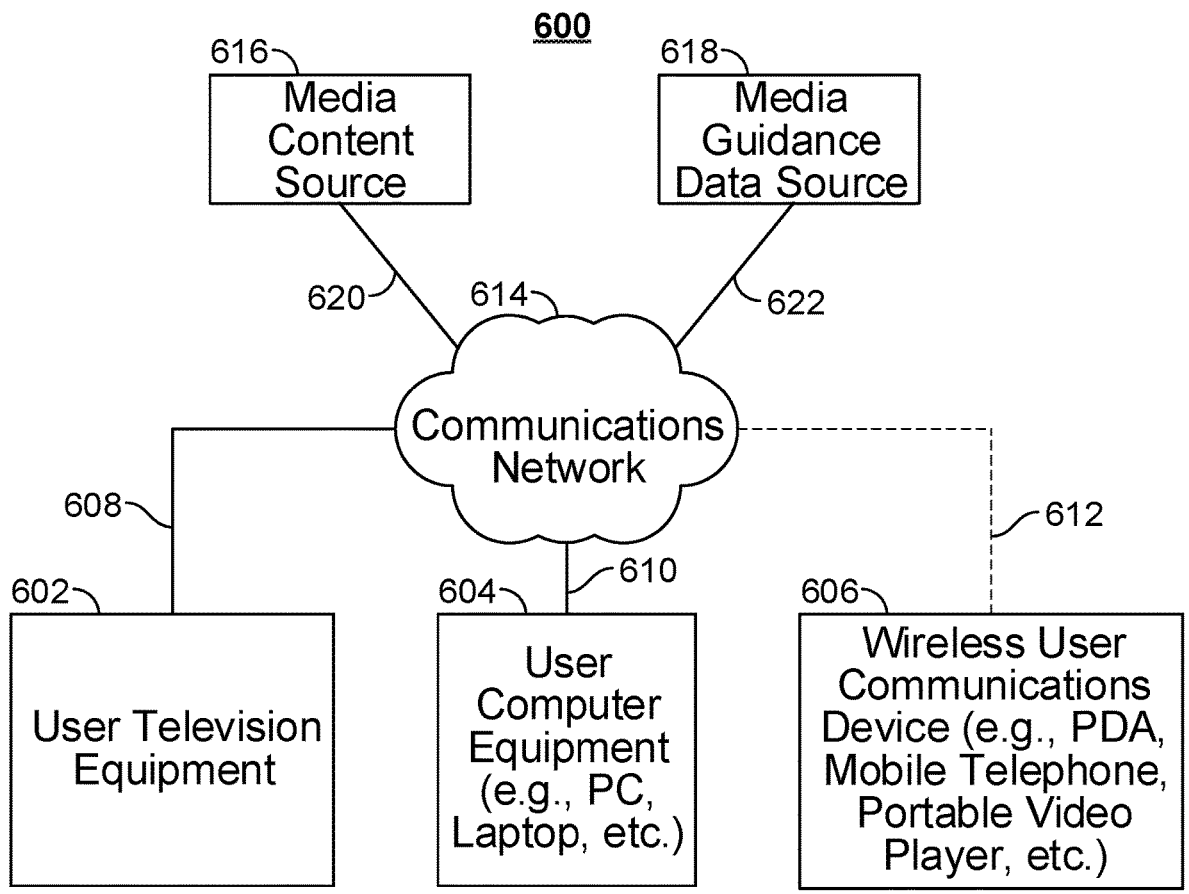
FIG. 6 is a block diagram of an illustrative media system, in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

System 600 may also include an advertisement source 624 coupled to communications network 614 via a communications path 626. Path 626 may include any of the communication paths described above in connection with paths 608, 610, and 612.

Advertisement source 624 may include advertisement logic to determine which advertisements to transmit to specific users and under which circumstances. For example, a cable operator may have the right to insert advertisements during specific time slots on specific channels. Thus, advertisement source 624 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 624 may be configured to maintain user information including advertisement-suitability scores associated with user in order to provide targeted advertising. Additionally or alternatively, a server associated with advertisement source 624 may be configured to store raw information that may be used to derive advertisement-suitability scores. In some embodiments, advertisement source 624 may transmit a request to another device for the raw information and calculate the advertisement-suitability scores. Advertisement source 624 may update advertisement-suitability scores for specific users (e.g., first subset, second subset, or third subset of users) and transmit an advertisement of the target product to appropriate users.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
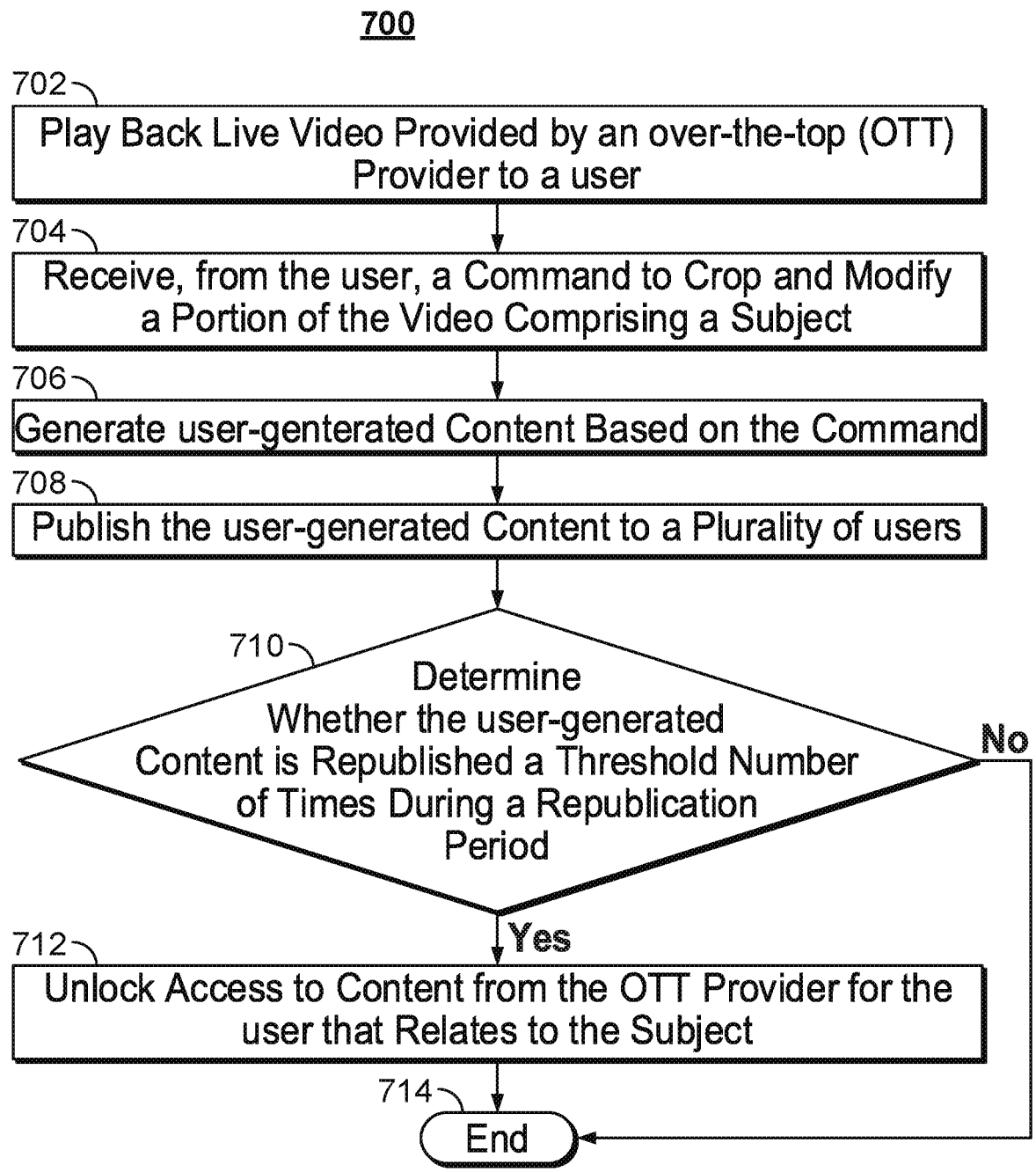
FIG. 7 is a flowchart of a detailed illustrative process for creating and rewarding content creation while consuming a live video, in accordance with some embodiments of the disclosure.

FIG. 7 is a flowchart of a detailed illustrative process for creating and rewarding content creation while consuming a live video, in accordance with some embodiments of the disclosure. It should be noted that process 700 or any step thereof could be performed on, or provided by, any of the devices shown in FIGS. 5-6. For example, process 700 may be executed by control circuitry 504 (FIG. 5) as instructed by a media guidance application implemented on user equipment 102 (which may have the functionality of any or all of user 106 equipment 602, 604, and/or 606 (FIG. 6)). In addition, one or more steps of process 700 may be incorporated into or combined with one or more steps of any other process or embodiment (e.g., as described in relation to FIGS. 8-13). Many elements of process 700 have been described above with respect to FIG. 1 and FIG. 2, and those descriptions have full force and effect with respect to the below description of process 700, and thus details on previously-described elements are omitted for the sake of brevity.

Process 700 begins at 702 where control circuitry 504 plays back live video (e.g., media asset 110) on display 512 of user equipment device 102, provided by an over-the-top (OTT) provider to a user 106. At 704, control circuitry receives, from user 106, using user input interface 510, a command to crop and modify a portion of the video comprising a subject. At 706, control circuitry 504 generates user-generated content 206 based on the command. At 708, control circuitry 504 publishes the user-generated content 206 via the communications network to a plurality of users associated with user computer equipment 604 and wireless communications devices 606. At 710, control circuitry 504 determines whether the user-generated content 206 is republished a threshold number of times during a republication period. In response to determining that the user-generated content 206 is republished a threshold number of times during a republication period, process 700 moves to 712, where control circuitry unlocks access to content in storage 616 from the OTT provider for the user 106 that relates to the subject. In response to determining that the user-generated content 206 is not republished a threshold number of times during a republication period, process 700 moves to 714 to end.

Figure 8:
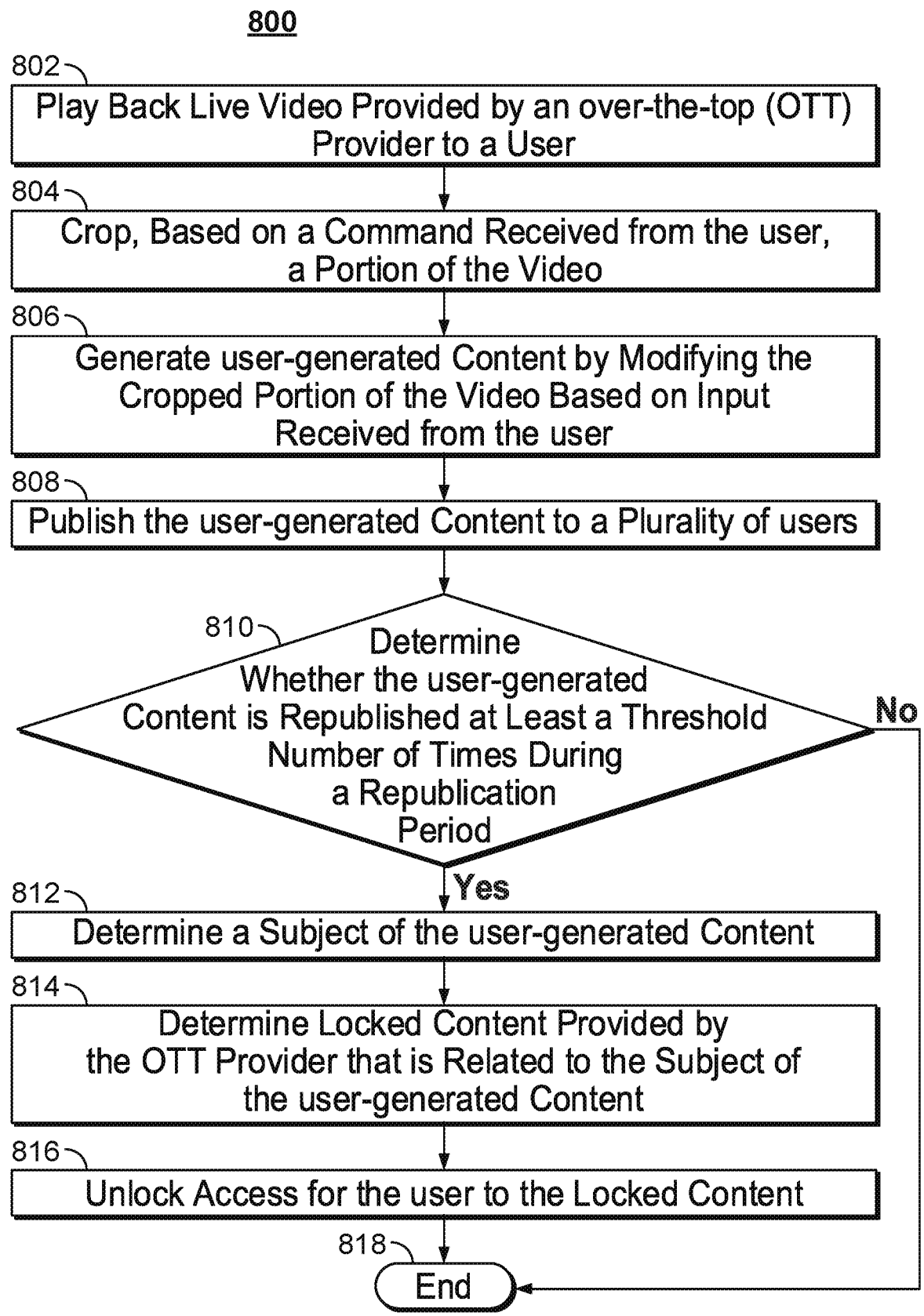
FIG. 8 is a flowchart of a detailed illustrative process for creating and rewarding content creation while consuming a live video, in accordance with some embodiments of the disclosure.

FIG. 8 is a flowchart of a detailed illustrative process for creating and rewarding content creation while consuming a live video, in accordance with some embodiments of the disclosure. It should be noted that process 800 or any step thereof could be performed on, or provided by, any of the devices shown in FIGS. 5-6. For example, process 800 may be executed by control circuitry 504 (FIG. 5) as instructed by a media guidance application implemented on user equipment 102 (which may have the functionality of any or all of user equipment 602, 604, and/or 606 (FIG. 6)). In addition, one or more steps of process 800 may be incorporated into or combined with one or more steps of any other process or embodiment (e.g., as described in relation to FIGS. 7 and 9-13). Many elements of process 800 have been described above with respect to FIG. 1 and FIG. 2, and those descriptions have full force and effect with respect to the below description of process 800, and thus details on previously-described elements are omitted for the sake of brevity.

Process 800 begins at 802 where control circuitry 504 plays back live video (e.g., media asset 110) on display 512 of user equipment device 102, provided by an over-the-top (OTT) provider to a user 106. At 804, control circuitry 504 crops, based on a command received via user input interface 510 from the user 106, a portion of the video. At 806, control circuitry 504 generates user-generated content 206 by modifying the cropped portion of media asset 110 based on input received from the user 106. At 808, control circuitry publishes via the communications network the user-generated content 206 to a plurality of users associated with user computer equipment 604 and wireless communications devices 606. At 810, control circuitry 810 determines whether the user-generated content 206 is republished at least a threshold number of times during a republication period. In response to determining that the user-generated content 206 is republished at least the threshold number of times during the republication period, process 800 proceeds to 812 to determine a subject of the user-generated content 206. In response to determining that the user-generated content 206 is not republished at least the threshold number of times during the republication period, process 800 ends at 818. At 814, control circuitry 504 proceeds to determine locked content in storage 508 provided by the OTT provider that is related to the subject of the user-generated content 206. At 816, control circuitry 504 unlocks access for the user 106 to the locked content.

Figure 9:
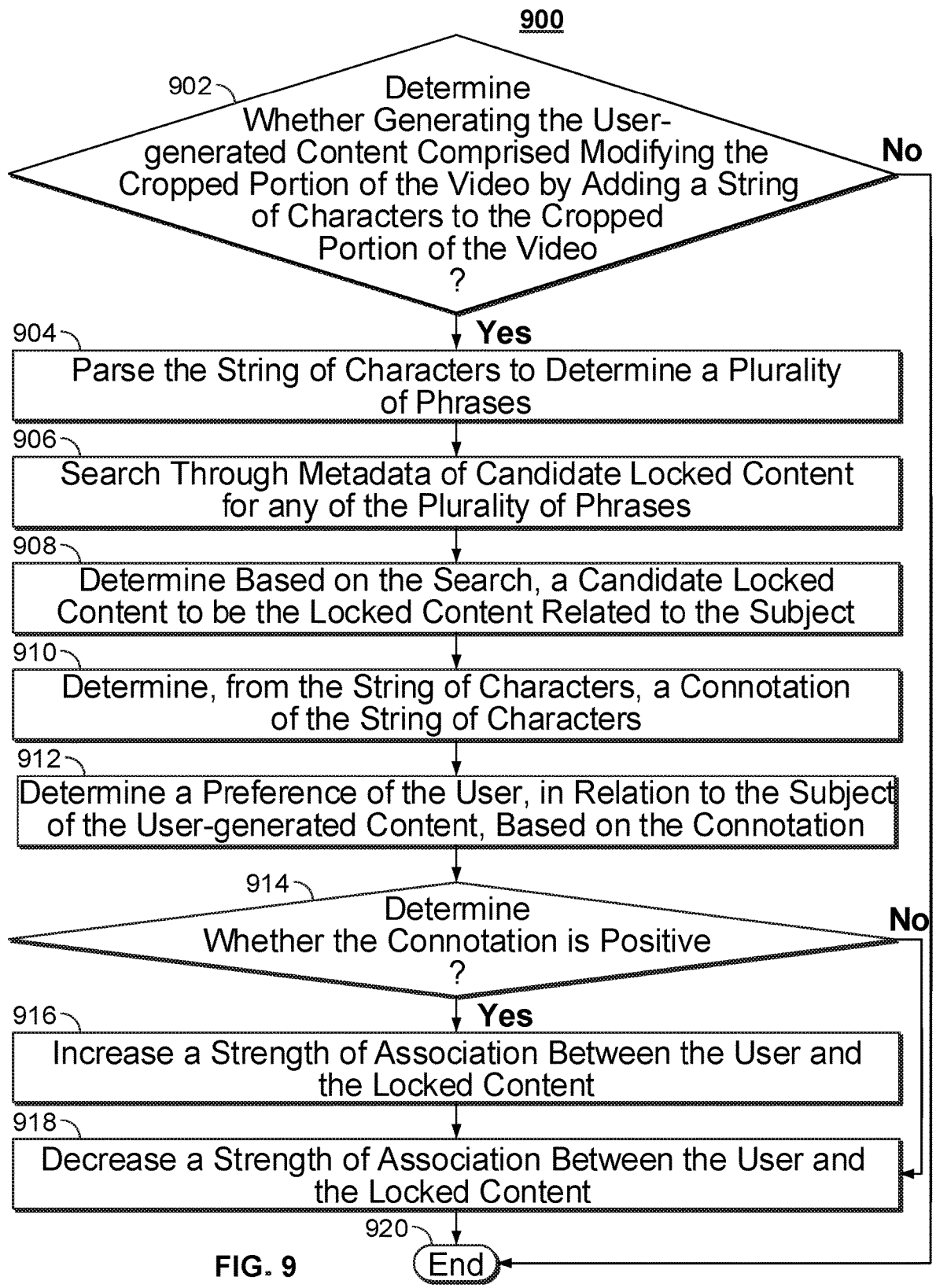
FIG. 9 is a flowchart of a detailed illustrative process for determining a subject related to the user-generated content, in accordance with some embodiments of the disclosure.

FIG. 9 is a flowchart of a detailed illustrative process for determining a subject related to the user-generated content 206, in accordance with some embodiments of the disclosure. It should be noted that process 900 or any step thereof could be performed on, or provided by, any of the devices shown in FIGS. 5-6. For example, process 900 may be executed by control circuitry 504 (FIG. 5) as instructed by a media guidance application implemented on user equipment 102 (which may have the functionality of any or all of user equipment 602, 604, and/or 606 (FIG. 6)). In addition, one or more steps of process 800 may be incorporated into or combined with one or more steps of any other process or embodiment (e.g., as described in relation to FIGS. 7-8 and 10-13). Many elements of process 900 have been described above with respect to FIG. 1 and FIG. 2, and those descriptions have full force and effect with respect to the below description of process 900, and thus details on previously-described elements are omitted for the sake of brevity.

Process 900 begins at 902 where control circuitry 504 determines whether generating the user-generated content 206 comprised modifying the cropped portion of media asset 110 by adding a string of characters, received via user input interface 510, to the cropped portion of media asset 110. In response to determining that generating the user-generated content 206 comprised modifying the cropped portion of media asset 110 by adding a string of characters to the cropped portion of media asset 110, the process 900 moves to 904, where control circuitry 504 parses the string of characters to determine a plurality of phrases. In response to determining that generating the user-generated content 206 comprised modifying the cropped portion of media asset 110 by adding a string of characters to the cropped portion of media asset 110, the process 900 ends at 920. At 906, control circuitry 504 searches through metadata of candidate locked content in storage 508 for any of the plurality of phrases. At 908, control circuitry 504 determines based on the search, a candidate locked content to be the locked content related to the subject. At 910, control circuitry 504 determines, from the string of characters, a connotation of the string of characters. At 912, control circuitry 504 determines a preference of the user 106, in relation to the subject of the user-generated content 206, based on the connotation. At 914, control circuitry 504 determines whether the connotation is positive. In response to determining that the connotation is positive, control circuitry 504 increases a strength of association between the user 106 and the locked content. In response to determining that the connotation is negative, control circuitry 504 decreases a strength of association between the user 106 and the locked content.

Figure 10:
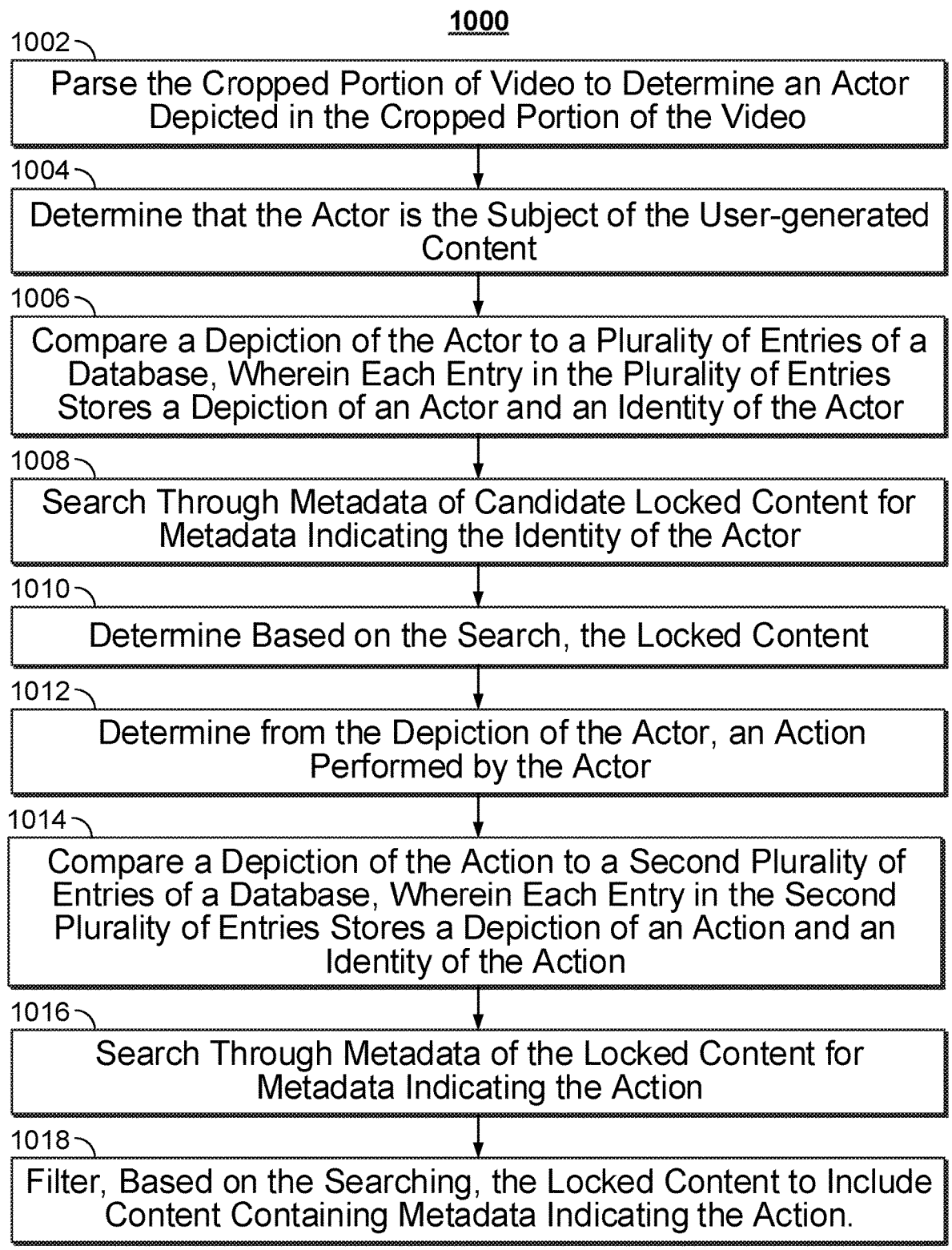
FIG. 10 is a flowchart of a detailed illustrative process for determining a subject related to the user-generated content, in accordance with some embodiments of the disclosure.

FIG. 10 is a flowchart of a detailed illustrative process for determining a subject related to the user-generated content 206, in accordance with some embodiments of the disclosure. It should be noted that process 1000 or any step thereof could be performed on, or provided by, any of the devices shown in FIGS. 5-6. For example, process 1000 may be executed by control circuitry 504 (FIG. 5) as instructed by a media guidance application implemented on user equipment 102 (which may have the functionality of any or all of user equipment 602, 604, and/or 606 (FIG. 6)). In addition, one or more steps of process 1000 may be incorporated into or combined with one or more steps of any other process or embodiment (e.g., as described in relation to FIGS. 7-9 and 11-13). Many elements of process 1000 have been described above with respect to FIG. 1 and FIG. 2, and those descriptions have full force and effect with respect to the below description of process 1000, and thus details on previously-described elements are omitted for the sake of brevity.

Process 1000 begins at 1002, where control circuitry 504 parses the cropped portion of media asset 110 to determine an actor depicted in the cropped portion of media asset 110. At 1004, control circuitry 504 determines that the actor is the subject of the user-generated content 206. At 1006, control circuitry 504 compares compare a depiction of the actor to a plurality of entries of a database in storage 508, wherein each entry in the plurality of entries stores a depiction of an actor and an identity of the actor. At 1008, control circuitry 504 searches through metadata of candidate in storage 508 locked content for metadata indicating the identity of the actor. At 1010, control circuitry 504 determines based on the search, the locked content. At 1012, control circuitry 1012 determines from the depiction of the actor, an action performed by the actor. At 1014, control circuitry 504 searches through metadata in storage 508 of the locked content for metadata indicating the action. At 1016, control circuitry 504 filters, based on the searching, the locked content to include content containing metadata indicating the action.

Figure 11:
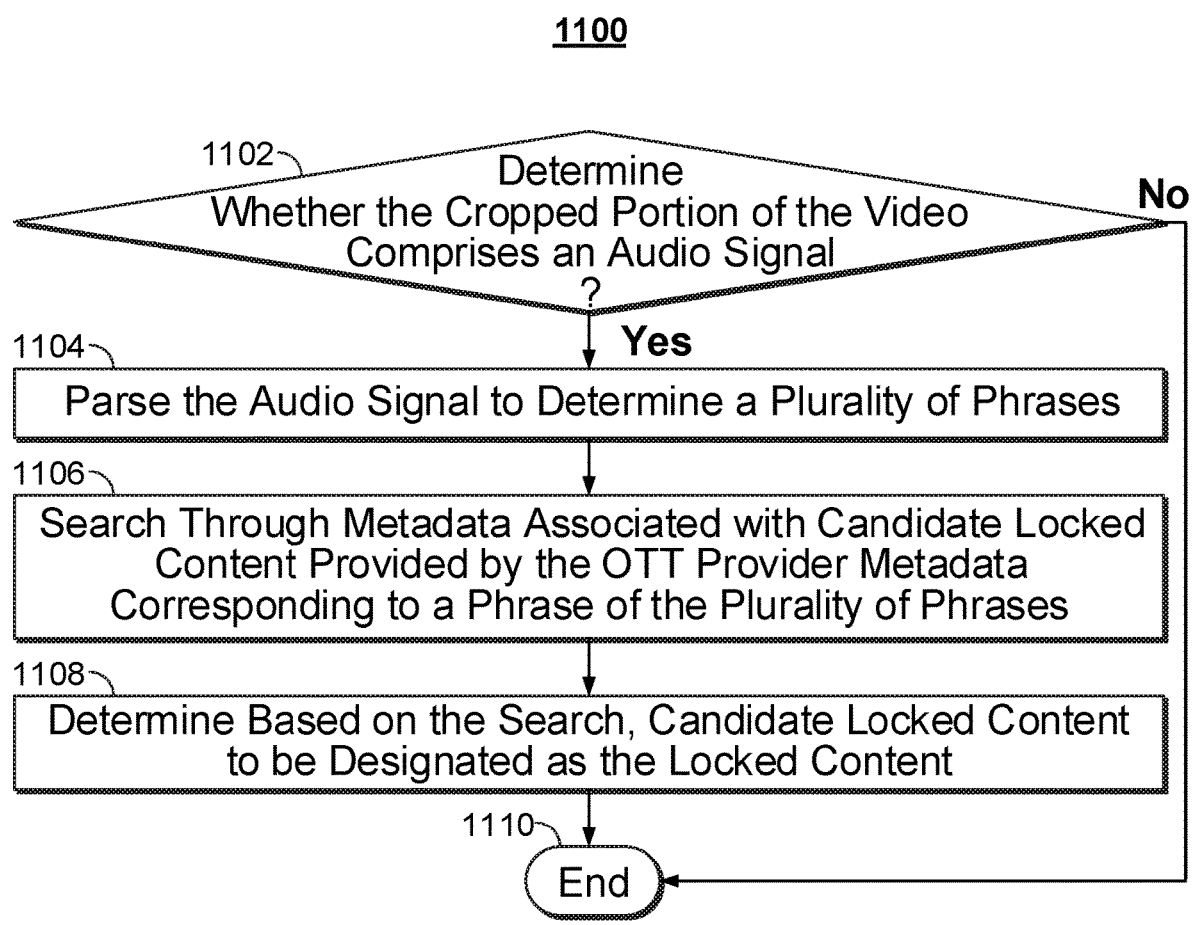
FIG. 11 is a flowchart of a detailed illustrative process for determining a subject related to the user-generated content, in accordance with some embodiments of the disclosure.

FIG. 11 is a flowchart of a detailed illustrative process for determining a subject related to the user-generated content 206, in accordance with some embodiments of the disclosure. It should be noted that process 900 or any step thereof could be performed on, or provided by, any of the devices shown in FIGS. 5-6. For example, process 900 may be executed by control circuitry 504 (FIG. 5) as instructed by a media guidance application implemented on user equipment 102 (which may have the functionality of any or all of user equipment 602, 604, and/or 606 (FIG. 6)). In addition, one or more steps of process 1100 may be incorporated into or combined with one or more steps of any other process or embodiment (e.g., as described in relation to FIGS. 7-10 and 12-13). Many elements of process 1100 have been described above with respect to FIG. 1 and FIG. 2, and those descriptions have full force and effect with respect to the below description of process 1100, and thus details on previously-described elements are omitted for the sake of brevity.

Process 1100 begins at 1102, when control circuitry 504 determines whether the cropped portion of media asset 110 comprises an audio signal. In response to determining that the cropped portion of media asset 110 comprises an audio signal, control circuitry 504 moves proves 1100 to 1104 to parse the audio signal to determine a plurality of phrases. In response to determining that the cropped portion of media asset 110 comprises an audio signal, control circuitry 504 moves process 1100 to 1110 to end. At 1106, control circuitry 504 searches through metadata associated with candidate locked content in storage 508 provided by the OTT provider metadata corresponding to a phrase of the plurality of phrases. At 1108, control circuitry 504 determines based on the search, candidate locked content in storage 508 to be designated as the locked content.

Figure 12:
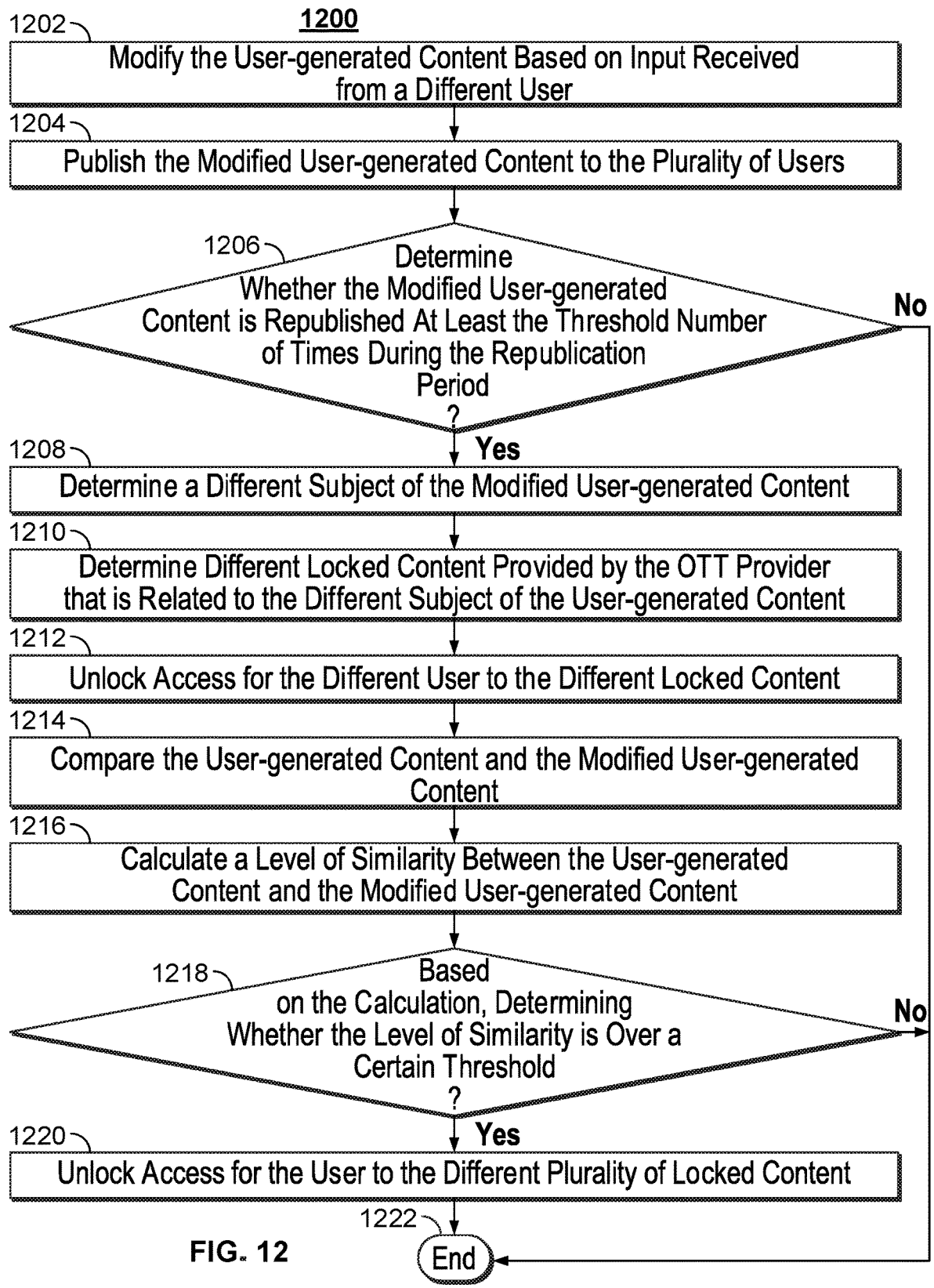
FIG. 12 is a flowchart of a detailed illustrative process for modifying the user-generated content, in accordance with some embodiments of the disclosure.

FIG. 12 is a flowchart of a detailed illustrative process for modifying the user-generated content 206, in accordance with some embodiments of the disclosure. It should be noted that process 1200 or any step thereof could be performed on, or provided by, any of the devices shown in FIGS. 5-6. For example, process 1200 may be executed by control circuitry 504 (FIG. 5) as instructed by a media guidance application implemented on user equipment 102 (which may have the functionality of any or all of user equipment 602, 604, and/or 606 (FIG. 6)). In addition, one or more steps of process 1200 may be incorporated into or combined with one or more steps of any other process or embodiment (e.g., as described in relation to FIGS. 7-11 and 13). Many elements of process 1200 have been described above with respect to FIG. 1 and FIG. 2, and those descriptions have full force and effect with respect to the below description of process 1200, and thus details on previously-described elements are omitted for the sake of brevity.

Process 1200 begins at 1202, where control circuitry 504 modifies the user-generated content 206 based on input received, via user input interface 510, from a different user associated with a user computer equipment 604 or wireless communications device 606. At 1204, control circuitry 504 publishes via the communications network, the modified user-generated content 206 to the plurality of users associated with a user computer equipment 604 or wireless communications device 606. At 1206, control circuitry 504 determines whether the modified user-generated content is republished at least the threshold number of times during the republication period. In response to determining that the modified user-generated content is republished at least the threshold number of times during the republication period, control circuitry 504 moves process 1200 to 1208 to determine a different subject of the modified user-generated content. In response to determining that the modified user-generated content is not republished at least the threshold number of times during the republication period, control circuitry 504 moves process 1200 to 1222 to end. At 1210, control circuitry 504 determines different locked content provided by the OTT provider that is related to the different subject of the user-generated content 206. At 1212, control circuitry 504 compares user-generated content 206 and the modified user-generated content. At 1216, control circuitry 504 calculates a level of similarity between the user-generated content 206 and the modified user-generated content. At 1218, based on the calculation, control circuitry 504 determines whether the level of similarity is over a certain threshold. In response to determining that the level of similarity is over a certain threshold, control circuitry 504 moves process 1200 to 1220 to unlock access for the user 106 to the different plurality of locked content in storage 508. In response to determining that the level of similarity is not over a certain threshold, control circuitry 504 moves process 1200 to 1222 to end.

Figure 13:
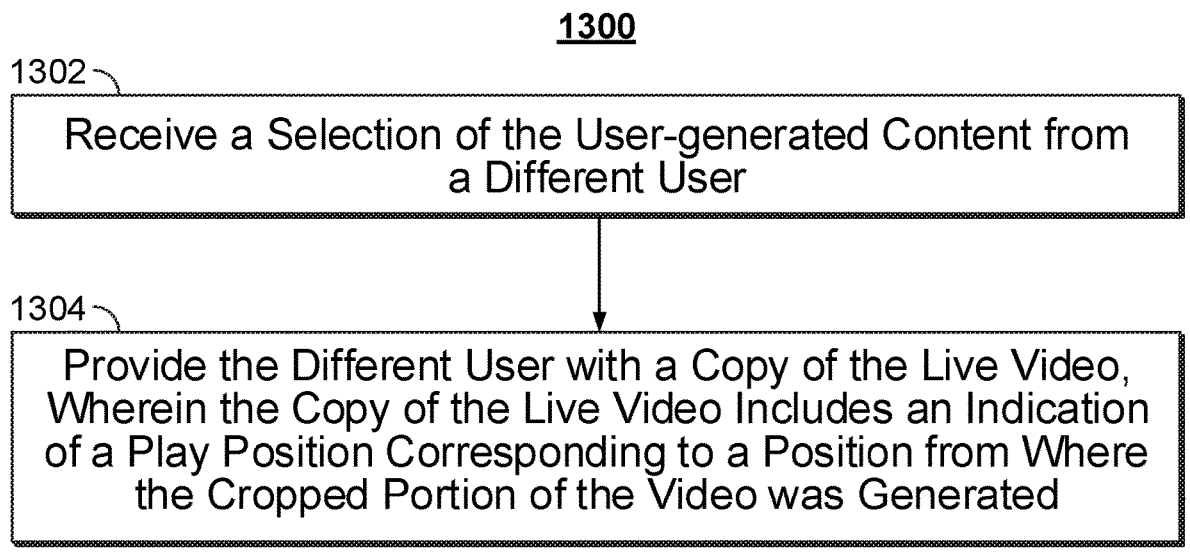
FIG. 13 is a flowchart of a detailed illustrative process for providing access to the live video from the user-generated content, in accordance with some embodiments of the disclosure.

FIG. 13 is a flowchart of a detailed illustrative process for providing access to media asset 110 from the user-generated content 206, in accordance with some embodiments of the disclosure. It should be noted that process 1300 or any step thereof could be performed on, or provided by, any of the devices shown in FIGS. 5-6. For example, process 1300 may be executed by control circuitry 504 (FIG. 5) as instructed by a media guidance application implemented on user equipment 102 (which may have the functionality of any or all of user equipment 602, 604, and/or 606 (FIG. 6)). In addition, one or more steps of process 1300 may be incorporated into or combined with one or more steps of any other process or embodiment (e.g., as described in relation to FIGS. 7-12). Many elements of process 1300 have been described above with respect to FIG. 1 and FIG. 2, and those descriptions have full force and effect with respect to the below description of process 1300, and thus details on previously-described elements are omitted for the sake of brevity.

Process 1300 begins at 1302 where control circuitry 504 receives a selection of the user-generated content 206 from a different user via user input interface 510. At 1304, control circuitry 504 provides the different user with a copy of media asset 110, wherein the copy of media asset 110 includes an indication of a play position corresponding to a position from where the cropped portion of media asset 110 was generated for display on display 512 of user equipment device 102.

In some embodiments, the processes described in FIGS. 7-13 may be performed on remote servers that are able to host the processes. The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for enabling and monitoring content creation, the method comprising:
   playing back live video provided by an over-the-top (OTT) provider to a user;
   cropping, based on a command received from the user, a portion of the video;
   generating user-generated content by modifying the cropped portion of the video based on input received from the user;
   publishing the user-generated content to a plurality of users;
   determining whether the user-generated content is republished at least a threshold number of times during a republication period; and
   in response to determining that the user-generated content is republished at least the threshold number of times during the republication period:
   determining a subject of the user-generated content, determining locked content provided by the OTT provider that is related to the subject of the user-generated content, and unlocking access for the user to the locked content.

2. The method of claim 1, wherein determining the locked content comprises:
   determining whether generating the user-generated content comprised modifying the cropped portion of the video by adding a string of characters to the cropped portion of the video; and
   in response to determining that generating the user-generated content comprised modifying the cropped portion of the video by adding a string of characters to the cropped portion of the video:
   parsing the string of characters to determine a plurality of phrases;
   searching through metadata of candidate locked content for any of the plurality of phrases; and
   determining based on the search, a candidate locked content to be the locked content related to the subject.

3. The method of claim 2, further comprising:
   determining whether the string of characters refers to a particular locked content; and
   in response to determining that the string of characters refers to a particular locked content, unlocking access for the user to the particular content.

4. The method of claim 2, further comprising:
   determining, from the string of characters, a connotation of the string of characters;
   determining a preference of the user, in relation to the subject of the user-generated content, based on the connotation;
   determining whether the connotation is positive or negative;
   in response to determining that the connotation is positive, increasing a strength of association between the user and the locked content; and in response to determining that the connotation is negative, decreasing a strength of association between the user and the locked content.

5. The method of claim 1, wherein determining the locked content comprises:
parsing the cropped portion of video to determine an actor depicted in the cropped portion of the video;
determining that the actor is the subject of the user-generated content;
comparing a depiction of the actor to a first plurality of entries of a database,
wherein each entry in the first plurality of entries stores a depiction of an actor and an identity of the actor;
searching through metadata of candidate locked content for metadata indicating the identity of the actor; and
determining based on the search, the locked content.

6. The method of claim 5, wherein determining the actor depicted in the cropped portion of the video comprises:
determining from the depiction of the actor, an action performed by the actor;
comparing a depiction of the action to a second plurality of entries of a database,
wherein each entry in the second plurality of entries stores a depiction of an action and an identity of the action;
searching through metadata of the locked content for metadata indicating the action; and
filtering, based on the searching, the locked content to include content containing metadata indicating the action.

7. The method of claim 1, wherein determining the locked content comprises:
determining whether the cropped portion of the video comprises an audio signal;
in response to determining that the cropped portion of the video comprises an audio signal:
parsing the audio signal to determine a plurality of phrases;
searching through metadata associated with candidate locked content provided by the OTT provider metadata corresponding to a phrase of the plurality of phrases; and
determining based on the search, candidate locked content to be designated as the locked content.

8. The method of claim 1, further comprising:
modifying the user-generated content based on input received from a different user;
publishing the modified user-generated content to the plurality of users;
determining whether the modified user-generated content is republished at least the threshold number of times during the republication period; and
in response to determining that the modified user-generated content is republished at least the threshold number of times during the republication period:
determining a different subject of the modified user-generated content;
determining different locked content provided by the OTT provider that is related to the different subject of the user-generated content; and
unlocking access for the different user to the different locked content.

9. The method of claim 8, further comprising:
comparing the user-generated content and the modified user-generated content;
calculating a level of similarity between the user-generated content and the modified user-generated content;
based on the calculation, determining whether the level of similarity is over a certain threshold; and
in response to determining that the level of similarity is over the threshold, unlocking access for the user to the different plurality of locked content.

10. The method of claim 1, further comprising:
receiving a selection of the user-generated content from a different user; and
providing the different user with a copy of the live video, wherein the copy of the live video includes an indication of a play position corresponding to a position from where the cropped portion of the video was generated.

11. A system for enabling and monitoring content creation, the system comprising control circuitry configured to:
play back live video provided by an over-the-top (OTT) provider to a user;
crop, based on a command received from the user, a portion of the video;
generate user-generated content by modifying the cropped portion of the video based on input received from the user;
publish the user-generated content to a plurality of users;
determine whether the user-generated content is republished at least a threshold number of times during a republication period; and
in response to determining that the user-generated content is republished at least the threshold number of times during the republication period:
determine a subject of the user-generated content, determine locked content provided by the OTT provider that is related to the subject of the user-generated content, and unlock access for the user to the locked content.

12. The system of claim 11, wherein the control circuitry is further configured, when determining the locked content, to:
determine whether generating the user-generated content comprised modifying the cropped portion of the video by adding a string of characters to the cropped portion of the video; and
in response to determining that generating the user-generated content comprised modifying the cropped portion of the video by adding a string of characters to the cropped portion of the video:
parse the string of characters to determine a plurality of phrases;
search through metadata of candidate locked content for any of the plurality of phrases; and
determine based on the search, a candidate locked content to be the locked content related to the subject.

13. The system of claim 12, wherein the control circuitry is further configured to:
determine whether the string of characters refers to a particular locked content; and
in response to determining that the string of characters refers to a particular locked content, unlock access for the user to the particular content.

14. The system of claim 12, wherein the control circuitry is further configured to:
determine, from the string of characters, a connotation of the string of characters;
determine a preference of the user, in relation to the subject of the user-generated content, based on the connotation;
determine whether the connotation is positive or negative;

in response to determining that the connotation is positive, increase a strength of association between the user and the locked content; and in response to determining that the connotation is negative, decrease a strength of association between the user and the locked content.

15. The system of claim 11, wherein the control circuitry is further configured, when determining the locked content comprises, to:

parse the cropped portion of video to determine an actor depicted in the cropped portion of the video;

determine that the actor is the subject of the user-generated content;

compare a depiction of the actor to a first plurality of entries of a database, wherein each entry in the first plurality of entries stores a depiction of an actor and an identity of the actor;

search through metadata of candidate locked content for metadata indicating the identity of the actor; and determine based on the search, the locked content.

16. The system of claim 15, wherein the control circuitry is further configured, when determining the actor depicted in the cropped portion of the video comprises, to:

determine from the depiction of the actor, an action performed by the actor;

compare a depiction of the action to a second plurality of entries of a database, wherein each entry in the second plurality of entries stores a depiction of an action and an identity of the action;

search through metadata of the locked content for metadata indicating the action; and filter, based on the searching, the locked content to include content containing metadata indicating the action.

17. The system of claim 11, wherein the control circuitry is further configured, when determining the locked content, to:

determine whether the cropped portion of the video comprises an audio signal;

in response to determining that the cropped portion of the video comprises an audio signal:

parse the audio signal to determine a plurality of phrases;

search through metadata associated with candidate locked content provided by the OTT provider metadata corresponding to a phrase of the plurality of phrases; and determine based on the search, candidate locked content to be designated as the locked content.

18. The system of claim 11, wherein the control circuitry is further configured to:

modify the user-generated content based on input received from a different user;

publish the modified user-generated content to the plurality of users;

determine whether the modified user-generated content is republished at least the threshold number of times during the republication period; and in response to determining that the modified user-generated content is republished at least the threshold number of times during the republication period:

determine a different subject of the modified user-generated content;

determine different locked content provided by the OTT provider that is related to the different subject of the user-generated content; and unlock access for the different user to the different locked content.

19. The system of claim 18, wherein the control circuitry is further configured to:

compare the user-generated content and the modified user-generated content;

calculate a level of similarity between the user-generated content and the modified user-generated content;

based on the calculation, determine whether the level of similarity is over a certain threshold; and in response to determining that the level of similarity is over the threshold, unlock access for the user to the different plurality of locked content.

20. The system of claim 11, wherein the control circuitry is further configured to: receive a selection of the user-generated content from a different user; and provide the different user with a copy of the live video, wherein the copy of the live video includes an indication of a play position corresponding to a position from where the cropped portion of the video was generated.

* * * * *